United States Patent [19]

Westeppe et al.

[11] Patent Number: 5,122,571
[45] Date of Patent: Jun. 16, 1992

[54] MOULDING COMPOUNDS OF POLYAMIDES AND GRAFT POLYMERS CONTAINING TERT.-BUTYLACRYLATE

[75] Inventors: Uwe Westeppe, Mettmann; Karl-Erwin Piejko, Bergisch-Gladbach; Rolf-Peter Müller, Leverkusen; Gerd Fengler, Krefeld; Christian Lindner, Cologne, all of Fed. Rep. of Germany

[73] Assignee: Bayer Aktiengesellschaft, Leverkusen, Fed. Rep. of Germany

[21] Appl. No.: 406,428

[22] Filed: Sep. 11, 1989

[30] Foreign Application Priority Data

Sep. 23, 1988 [DE] Fed. Rep. of Germany ....... 3832397

[51] Int. Cl.⁵ .............................................. C08L 77/00
[52] U.S. Cl. ...................................... 525/66; 525/179
[58] Field of Search .......................................... 525/66

[56] References Cited

U.S. PATENT DOCUMENTS

| | | | |
|---|---|---|---|
| 4,242,469 | 12/1980 | Schmitt et al. | 525/77 |
| 4,338,406 | 7/1982 | Sanderson et al. | 525/66 |
| 4,584,344 | 4/1986 | Baer | 525/66 |
| 4,694,042 | 9/1987 | McKee et al. | 525/66 |
| 4,785,050 | 11/1988 | Wittmann et al. | 525/66 |

Primary Examiner—Ana L. Carrillo
Attorney, Agent, or Firm—Connolly and Hutz

[57] ABSTRACT

This invention relates to new thermoplastic moulding compounds of polyamides, graft polymers containing tert.-butylacrylate in the shell and optionally also rubber polymers as impact strength modifiers.

7 Claims, No Drawings

MOULDING COMPOUNDS OF POLYAMIDES AND GRAFT POLYMERS CONTAINING TERT.-BUTYLACRYLATE

This invention relates to new thermoplastic moulding compounds of polyamides, graft polymers containing tert.-butylacrylate in the shell and optionally also rubber polymers as impact strength modifiers.

PA moulding compounds containing from 1 to 40% by weight of copolymers of olefines and (meth)acrylic acid esters of a tertiary alcohol are known from DE-AS 1 669 702. These moulding compounds have improved impact strength but they are insufficiently tough for many applications.

According to DE-AS 2 403 889, mixtures of amorphous polyamides and impact strength modified styrene copolymers with acrylic acid derivatives have advantageous mechanical properties. Acrylonitrile and esters of primary and secondary alcohols are preferred acrylic acid derivatives.

DE-AS 2 941 025 teaches that the toughness of polyamides may be considerably improved in particular by mixing the polyamides with graft rubbers based on polybutadiene containing a shell of acrylic acid esters of primary and secondary alcohols and in addition a t-butyl ester of (meth)acrylic acid.

EP-A 0 049 103 describes polymer mixtures of a polyamide and vinyl copolymers which contain esters and an imide of an α, ω-unsaturated dicarboxylic acid and which are characterised inter alia by high dimensional stability, chemical resistance and resistance to heat and to abrasion.

Moulding compounds of polyamides, graft copolymers and olefine copolymers containing a high proportion of acid groups are known from EP-A 0 232 878. These moulding compounds have improved impact strength.

J 62/149 749 teaches that PA blends of polystyrene, inorganic fillers and a graft polymer of styrene/elastomer copolymer grafted with acid anhydrides, acid amides, acid imides, acid esters, epoxy groups or hydroxyl groups have good quality surfaces.

J 62/185 724 describes mixtures of polyamide and styrene polymers which have been modified with epoxy, carboxy or amino groups.

According to U.S. Pat. No. 4,740,552, a polyamide/styrene copolymer blend requires grafting with 0.05 to 5 parts of an unsaturated carboxylic acid anhydride to render the components compatible with one another so that delamination will not occur.

The variations known in the state of the art are complex multicomponent systems and yet the properties described are not adequate for high quality technical applications where a balanced combination of dimensional stability under heat, toughness (in particular joint seam strength) and mechanical strength is required. It has now surprisingly been found that moulding compounds distinguished by great toughness, high joint seam strength and smooth surfaces may be prepared from polyamides and graft polymers containing tert.-butylacrylate. These moulding compounds also have good temperature modulus characteristics.

This invention thus relates to thermoplastic moulding compounds containing

A) from 35 to 97% by weight, preferably from 40 to 95% by weight, especially from 45 to 85% by weight of a thermoplastic polyamide A, B) from 3 to 65% by weight, preferably from 5 to 60% by weight, especially from 15 to 55% by weight of a graft polymer B containing graft shells B 1) of B 1.1) at least one monomer selected from styrenes, α-methyl styrenes, acrylonitrile, methacrylonitrile, and esters of (meth)acrylic acid and primary or secondary $C_1$ to $C_{10}$ alcohols; styrenes or α-methyl styrenes in combination with acrylonitrile being preferred, and B 1.2) at least one ester of (meth)acrylic acid and tertiary $C_4$ to $C_{10}$ alcohols in quantities of up to 15% by weight in the graft shell B 1)

grafted on a particulate rubber base B 2) having glass temperatures below 0° C., in particular below −20° C., the graft polymers B having rubber contents of from 5 to 60% by weight, preferably from 10 to 50% by weight, especially from 15 to 34% by weight, and optionally C) from 0 to 45% by weight, preferably from 5 to 35% by weight, especially from 5 to 25% by weight of a graft polymer as impact strength modifier having a rubber content of $\geq 55\%$ by weight. The rubber content of component C is at least 10% by weight higher, preferably at least 20% by weight higher than the rubber content of component B.

POLYAMIDES A

The polyamide used as polyamide component A of the moulding compounds according to the invention may be any partially crystalline polyamide, in particular polyamide-6, polyamide-6,6 and partially crystalline copolyamides based on these two components. Partially crystalline polyamides in which the acid component in particular consists partly or entirely (in addition to adipic acid or caprolactam) of therephthalic acid and/or isophthalic acid and/or suberic acid and/or sebacic acid and/or azelaic acid and/or dodecane dicarboxylic acid and/or adipic acid and/or a cyclohexane dicarboxylic acid and the diamine component consists partly or entirely in particular of m- and/or p-xylylene diamine and/or tetramethylene diamine and/or hexamethylene diamine and/or 2,2,4- and/or 2,4,4-trimethyl hexamethylene diamine and/or isophorone diamine and compositions of these compounds known in the art may also be used.

Partially crystalline polyamides prepared entirely or partly from lactams containing 6 to 12 carbon atoms, optionally with the addition of one or more of the above mentioned starting components, are also suitable.

Polyamide-6, polyamide-6,6 and copolyamides containing only small proportions (up to about 10% by weight) of the co-components are particularly preferred partially crystalline polyamides A. Amorphous polyamides may also be used as polyamide component A. These are obtained by the polycondensation of diamines such as ethylene diamine, tetramethylene diamine, hexamethylene diamine, decamethylene diamine, 2,2,4- and/or 2,4,4-trimethyl hexamethylene diamine, m- and/or p-xylylene diamine, bis-(4-aminocyclohexyl)-methane or mixtures of 4,4'- or 2,2'-diamino-dicyclohexyl methanes, 2,2-bis-(4-aminocyclohexyl)-propane, 3,3'-dimethyl-4,4'-diamino-dicyclohexyl methane, 3-aminomethyl-3,5,5-trimethylcyclohexylamine, 2,5- and/or 2,6-bis-(aminomethyl)-norbornane and/or 1,4-diamino-methyl cyclohexane with dicarboxylic acids such as oxalic acid, adipic acid, azelaic acid, decane dicarboxylic acid, heptadecane dicarboxylic acid, 2,2,4- and/or 2,4,4-trimethyl adipic acid, isophthalic acid or small quantities of terephthalic acid. Amorphous copolymers obtained from the polycondensation of several monomers are, of course, also suitable, as are copolymers prepared with the addition of amino carboxylic acids such as ω-amino caproic acid, ω-amino undecanoic acid or ω-amino lauric acid or their lactams.

Particularly suitable amorphous polyamides are the polyamides prepared from isophthalic acid, hexamethylene diamine and other diamines, such as 4,4'-diaminodicyclohexyl methane, isophorone diamine, 2,2,4- and/or 2,4,4-trimethyl-hexamethylene diamine or 2,5- and/or 2,6-bis-(aminomethyl)-norbornane; or from isophthalic acid, 4,4'-diamino-dicyclohexyl methane and ω-caprolactam; or from isophthalic acid, 3,3'-dimethyl-4,4'-diamino-dicyclohexyl methane and lauric lactam; or from terephthalic acid and the isomeric mixture of 2,2,4- and/or 2,4,4-trimethyl-hexamethylene diamine.

Mixtures of position isomeric diamino-dicyclohexyl methanes composed of
70 to 99 mol % of the 4,4'-diamino isomer,
1 to 30 mol % of the 2,4'-diamino isomer and
0 to 2 mol % of the 2,2'-diamino isomer
and optionally the corresponding more highly condensed diamines obtained by the hydrogenation of di-aminodiphenyl methane of technical quality may be used instead of pure 4,4'-diaminodicyclohexyl methane.

The polyamides A may also consist of mixtures of copolyamides, composed of repeating units of adipic acid and hexamethylene diamine and repeating units based on ε-caprolactam and polyhexamethylene adipamide (DE-OS 3 735 404), or of partially crystalline and amorphous polyamides, the proportion of amorphous polyamides being preferably less than that of the partially crystalline polyamides.

Partially crystalline polyamides based on polyamide-6, polyamide-66 and partially crystalline polyamides based on these main components with the addition of co-components of the above-mentioned type are preferred.

GRAFT POLYMERS B

Graft polymers B for the purpose of this invention are graft polymers containing graft shell B 1) of
B 1.1) at least one monomer selected from styrenes, α-methyl styrenes, acrylonitrile, methacrylonitrile, and esters of (meth)acrylic acid with primary and secondary $C_1$ to $C_{10}$ alcohols, styrenes and α-methyl styrenes used in combination with acrylonitrile being preferred, and
B 1.2) at least one ester of (meth)acrylic acid and tert. $C_4$ to $C_{10}$ alcohols in quantities of up to 15% by weight in the graft shell B 1),
grafted on a particulate rubber basis B 2) with glass temperatures below 0° C., in particular below −20° C., the graft polymers B having rubber contents of from 5 to 60% by weight, preferably from 10 to 50% by weight, especially from 15 to 34% by weight.

The preferred monomers B 1.1) used as monomer units of the graft shell B 1) are styrene and α-methyl styrene on the one hand and, as additional monomers, acrylonitrile, methyl methacrylate, n-butyl acrylate, cyclohexyl methacrylate and vinyl acetate. Styrene, α-methyl styrene and acrylonitrile are particularly preferred. The styrenes and α-methyl styrenes may be substituted with alkyl, halogenoalkyl or halogen on the aromatic ring. e.g. they may be substituted with $C_1$ to $C_3$ alkyl groups, halogenated $C_1$ to $C_3$ alkyl groups and/or halogens, but styrene and α-methyl styrene are preferred.

The monomers B 1.2) for the purpose of this invention are tertiary (meth)acrylic acid esters corresponding to the following general formula

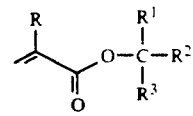

wherein
R = H or $CH_3$ and
$R_1$, $R_2$, $R_3$ = alkyl, the sum of the carbon atoms in $R_1$, $R_2$ and $R_3$ having a value from 3 to 9.

Tert.-butyl acrylate, tert.-butyl methacrylate, tert.-pentyl methacrylate and tert.-hexyl acrylate as well as tert.-octyl (meth)acrylate are particularly preferred monomers B 1.2).

The graft shell B 1) contains up to 15% by weight, preferably from 1 to 12% by weight, in particular from 3 to 10% by weight of the monomers B 1.2).

The particulate rubber base B 2) is an emulsion polymer prepared by radical polymerisation from at least partially cross-linked diene or alkyl acrylate rubbers having average particle diameters ($d_{50}$ value) of from 80 to 600 nm, preferably from 100 to 400 nm.

The following are examples of diene rubbers: polybutadiene, polyisoprene and copolymers of butadiene with up to 35% by weight of comonomers such as styrene, acrylonitrile, methyl methacrylate and $C_1$ to $C_6$ alkyl acrylate. Examples of acrylate rubbers include cross-linked particulate emulsion polymers of $C_1$ to $C_6$ alkyl acrylates, in particular $C_2$ to $C_6$ alkyl acrylates, optionally mixed with up to 15% by weight of comonomers such as styrene, methyl methacrylate, butadiene, vinylmethyl ether, acrylonitrile and at least one polyfunctional cross-linking comonomer, e.g. divinyl benzene, glycol-bis-acrylates, bisacrylamides, phosphoric acid triallyl esters, allyl esters of (meth)acrylic acid or triallyl isocyanurate. These acrylate rubbers may contain up to 4% by weight of the cross-linking comonomers. Rubber bases of this type are known. Particularly suitable acrylate rubber bases have a core-sheath structure, in particular with the core component amounting to 0.5 to 10% by weight, preferably 2 to 4% by weight.

The rubber base B 2) has gel contents (as a measure of crosslinking) above 60% by weight, preferably above 75% by weight. The gel contents are determined according to M. Hoffman et. al., Polymeranalytik I and II, Georg Thieme-Verlag, Stuttgart (1977).

The graft polymers B according to the invention are prepared by known methods of aqueous emulsion polymerisation with radical forming initiators at temperatures from 50° to 90° C. Persulphates, perphosphates, hydroperoxides and azo compounds are examples of suitable initiators. Inorganic, water soluble initiators are preferred. The graft polymerisation on the known rubbers is advantageously carried out with the aid of anionic emulsifiers of the type of carboxylic acid salts, e.g. salts of oleic acid, stearic acid, resinic acids, abietic acid and disproportionated derivatives thereof.

RUBBER POLYMERS C

The moulding compounds according to the invention optionally contain an additional component C consisting of a rubber polymer for further increasing the impact strength of the moulding compounds.

Preferred moulding compounds contain up to 45% by weight, preferably from 5 to 35, especially from 5 to 25% by weight of component C, based on the sum of A+B+C. Component C is a rubber polymer and contains or consists of a rubber polymer having freezing temperatures (glass temperatures) below 0° C., in particular below −20° C. The rubber polymer may be selected from homo, co or graft polymers based on diene monomer, olefine or acrylate rubbers which may be uncross-linked or, preferably, partially cross-linked or highly cross-linked. Component C should be selected from known rubber polymers conventionally used for improving the properties of thermoplastic polyamides, in particular their impact strength. The rubber content of components C should be ≧55% by weight, especially ≧70% by weight. This applies especially to components C selected from graft polymers.

Typical examples of components C include olefine rubbers such as diene rubbers and ethylene-propylene copolymers optionally containing small quantities of unconjugated diene monomers (so called EPDM rubbers) and especially diene monomer/acrylonitrile-copolymer rubbers and diene polymer/vinyl aryl polymer block copolymers such as styrene/butadiene block copolymers.

Olefine rubbers containing acid groups may also be used as components C but it is especially advantageous to use carboxyl group-containing terpolymers of ethylene, (meth)-acrylic acid and butyl acrylate. Rubber like copolymers of ethylene/vinyl acetate and ethylene/(meth)acrylic acid alkyl ester copolymers may also be used as component C and the ethylene copolymers containing amino acrylate monomers described in GB PS 1 284 489 are also suitable as component C. Copolymers of olefines, acrylates and monomers which are acidic in function such as (meth)acrylic acid or maleic acid anhydride may also be used.

Rubber like graft polymers are particularly suitable components C for the present invention, e.g. graft polymers of α-olefine polymers and carboxylic acid and/or ester graft monomers. Copolymers or homopolymers of ethylene, propylene and butene-(1) are suitable for use as graft basis for these graft polymers.

The poly-α-olefine rubber/maleic acid anhydride adducts disclosed in Patent Applications DE-A 2 622 876, EP-A 13 941, DE-A 2 622 973, DE-A 2 401 149 and EP-A 9757, the products of reaction of ethylene copolymers with maleic acid anhyride and dialkyl esters of maleic or fumaric acid known from DE-A 3 335 706, the polyolefine rubbers (GB-PS 998 439) grafted with unsaturated acids according to FR-PS 1 568 637 and the EPDM rubbers grafted with maleic acid described e.g. in DE-A 2 622 973 are also suitable graft polymers.

Graft polymers obtained by grafting styrene monomers and acrylonitrile on a rubber polymer having a glass temperature below 0° C., preferably below −20° C., are particularly suitable. The rubber polymers used for these graft polymers may be, for example, polybutadiene, butadiene/acrylic ester copolymers based e.g. on acrylic acid butyl ester and/or on acrylic acid ethylhexyl ester, polyacrylic acid alkyl esters, especially those containing 1 to 8 carbon atoms in the alkyl group, copolymers of butadiene, acrylic acid alkyl esters and vinyl alkyl ethers, and copolymers of ethylene, propylene and a diene component. The preparation of such rubber modified copolymers is known (e.g. from JA 48 850 or U.S. Pat. No. 4,217,424). The graft polymers disclosed in DE-A 2 906 222 obtained by grafting styrene and acrylonitrile on polybutadiene or copolymers of butadiene and α,β-unsaturated monomers such as styrene, acrylonitrile, lower alkyl esters or acrylic or methacrylic acid as well as the known grafted acrylate rubbers are also suitable as component C.

The multiphase polymers described e.g. in DE-A 3 200 070, consisting of a highly cross-linked diene rubber as core, with a first shell of cross-linked acrylate rubber (rubber with core/sheath structure) and a second shell of a polymer or copolymer of resin-forming monomers selected from styrene, acrylonitrile, methacrylonitrile, methacrylic acid esters or mixtures thereof are also particularly suitable.

The grafted, partially cross-linked diene and/or acrylate rubbers described in EP-A 0 134 937 and the graft products prepared from a cross-linked rubber as graft basis according to DE-A 2 758 615 are also suitable. The rubbers used for these graft products are preferably based on polybutadiene and/or polyisoprene and may contain up to 40% by weight, preferably up to 10% by weight of styrene and/or acrylonitrile and/or esters of acrylic acid as comonomers. The following may be used as graft monomers: acrylonitrile, methacrylonitrile and aliphatic esters and amides of acrylic acid and methacrylic acid containing up to 22 carbon atoms.

Particularly high quality moulding compounds according to the invention are obtained when partially cross-linked graft polymers having a particulate structure are used as component C. Their particle size ($d_{50}$ value) is advantageously in the range of from 0.05 to 2 μm, preferably from 0.08 to 0.6 μm, especially from 0.15 to 0.5 μm. The rubbers used for the preparation of such graft polymers are also particulate and at least partially cross-linked and have gel contents (as a measure of the degree of cross-linking) above 30% by weight, preferably above 70% by weight. Such graft polymers have rubber contents in the range of from 55 to 85% by weight, preferably from 70 to 80% by weight, and contain rubbers selected from diene rubbers (butadiene, isoprene) and their copolymers with styrene, acrylonitrile, alkyl (meth)acrylate or vinyl ethers, and alkyl acrylate rubbers ($C_1$ to $C_8$ alkyl-acrylate) and their copolymers with diene monomers, styrene, acrylonitrile, alkyl methacrylate, vinyl esters or vinyl ethers. Alkyl acrylate rubbers normally contain small quantities of polyfunctional comonomers which bring about cross-linking of the acrylate rubbers, e.g. divinyl benzene, diol-bis-(meth)acrylates, bis-acrylamides, acrylamide-methylol derivatives, trivinyl benzene, triallyl cyanurate or triallyl isocyanurate. Rubber bases of this type are known. Particularly suitable acrylate rubber bases have a core/sheath structure, in particular with a diene rubber core component amounting to 0.5 to 10% by weight, preferably 2 to 4% by weight.

The preferred monomers grafted on the rubber bases are alkyl methacrylate, styrene, acrylonitrile, alkyl acrylate and acrylamides, especially methyl methacrylate and combinations of methyl methacrylate and alkyl acrylates, and styrene in combination with acrylonitrile.

Graft polymers of type C which are particularly suitable and used for preference have rubber contents of ≧55% by weight, contain rubber with gel contents above 70% by weight, have particle sizes of from 0.15 to 0.5 μm, contain polybutadiene rubber or polybutyl acrylate rubber and corresponding core/sheath rubbers (according to DE-A 3 200 070) and contain, as their graft monomers, methyl methacrylate, especially in combination with n-alkyl acrylate or styrene-acrylonitrile mixtures with acrylonitrile contents of from 5 to 40% by weight. These graft polymers may all be prepared by known methods of emulsion graft polymerisation.

RESIN COMPONENT D

The moulding compounds according to the invention optionally contain, as additional component, resinous polymers or copolymers of styrene, α-methyl styrenes, (meth)acrylonitrile, esters of (meth)acrylic acid, or mixtures of these monomers whose limiting viscosities (Staudinger Indices) ($\eta$) are from 0.3 to 1.5 dl/g (measured in toluene at 23° C.). Copolymers of styrene or α-methyl styrene with acrylonitrile are preferred; these may contain up to 40% by weight of esters of (meth)acrylic acid, in particular methyl methacrylate or n-butyl acrylate. The styrene derivatives are present in proportions of from 100 to 10% by weight, preferably from 90 to 20% by weight, most preferably from 80 to 30% by weight. The resin component D contains no tertiary esters of (meth)acrylic acid and no comonomers containing reactive groups such as carboxyl, epoxide or anhydride groups. The vinyl polymers D are prepared by conventional processes such as radical polymerisation in the solvent free mass or in solution, suspension or emulsion, preferably by radical emulsion polymerisation in water. Component D may be present in the moulding compounds according to the invention in proportions of up to 25% by weight, based on the sum of components A+B+C, and is preferably present in proportions of less than 20% by weight.

Component B and, if used, components C and D are obtained as aqueous emulsions which may be worked up into a powder either separately or together by coagulation after the latices have been mixed together. When this procedure is adopted, the latex or latex mixture which is to be coagulated is adjusted to a pH of from 7 to 12, in particular from 8 to 11 if the latex mixture does not already have the appropriate pH value. Coagulation is preferably carried out by means of aqueous salt solutions which are at pH values of $\geq 5$, especially $\geq 7$. The proportions of components A and B and, if used, of C and D and the compositions of B and C (e.g. the rubber content) must be suitably adjusted to one another if the moulding compounds according to the invention are to have a well balanced combination of properties. If, for example, properties such as low water absorption are required to be combined with great toughness and joint seam strength, then the proportion of polyamide A is preferably below 70% by weight while the total rubber content (proportion of rubber in component B and optionally C, based on the total quantity of moulding compound) should be from 10 to 25% by weight, in particular from 12 to 20% by weight. The difference required to make these percentages up to 100% consists of the non-rubber constituents of component B and optionally C or of an additional resin component D. It will be seen from these considerations that if the moulding compounds according to the invention contain only a small proportion of B (from 3 to 15% by weight), then component C will be present in the quantities required to bring the total rubber content of B and C to within the given limits.

The polyamides A should preferably have a relative viscosity (determined on a 1% by weight solution in m-cresol at 25° C.) of from 2.0 to 5.0, preferably from 2.5 to 4.0.

Conventional additives such as lubricants and mould release agents, nucleating agents, stabilizers, fillers and reinforcing materials, flame retardants, dyes and thermostabilizers, antioxidants and/or light protective agents may also be added to the moulding componds according to the invention.

The moulding compounds according to the invention may be prepared by mixing the components in conventional mixing apparatus such as rollers, kneaders or single shaft or multishaft extruders. Although in most cases all the components are preferably mixed together in one step, it may sometimes be advisable initially to omit one or two components and add them at a later stage. Thus the moulding compounds according to the invention may be prepared by first melting and homogenising components A and C together and subsequently incorporating graft polymer B and optionally also the thermoplast D in the melt.

The temperature used for preparing the mixtures should be at least 10 deg. cent. and preferably not more than 80 deg. cent. above the melting point, or softening point in the case of non-crystalline materials, of whichever component has the highest melting or softening temperature. In view of their properties, the moulding compounds according to the invention are suitable for injection moulding or extrusion wherever the properties described above are required, e.g. in the motor vehicle construction industry (for bumpers), in electrotechnology and in mechanical engineering.

COMPONENTS USED

A) polyamide 6 having a relative viscosity (determined on a 1% by weight solution in m-cresol at 25° C.) of 3.0, B) graft polymers containing t-butyl acrylate,
  B1) the following are introduced into a reactor: 1940 g of water and 1688 g of a polybutadiene rubber latex having a solids content of 48% by weight and an average particle diameter ($d_{50}$) of 385 nm. The reactor is flushed with nitrogen for 15 minutes. After the reaction mixture has been heated to 65° C., a solution of 8 g of potassium peroxidisulphate in 200 g of water is added under a light stream of nitrogen. The following solutions are then fed simultaneously into the reactor over a period of 6 hours:
  Solution 1:
    1313 g of styrene,
    511 g of acrylonitrile,
    66.2 g of tert.-butyl acrylate.
  Solution 2:
    40 g of the sodium salt of disproportionated abietic acid
    34 g of 1N sodium hydroxide solution
    2200 g of water.
  Polymerisation is continued for 4 hours at 65° C. 1% by weight (based on the solids content) of a phenolic stabilizer is added and the latex (pH 10) is coagulated with an aqueous magnesium sulphate solution. The coagulate is washed with water and dried at 60° C.
  B 2) The following are introduced into a reactor: 810 g of water and 2189 g of an acrylate rubber latex having a core/sheath structure according to DE-OS 3 200 070 with a solids content of 37% by weight and an average particle diameter ($d_{50}$) of 480 nm. The reactor is flushed with nitrogen for 15 minutes. After the reaction mixture has been heated to 75° C., a solution of 8 g of potassium peroxidisulphate in 200 g of water is added under a light stream of nitrogen. The following solutions are then fed simultaneously into the reactor at 75° C. within 6 hours:

Solution 1:
  1191 g of α-methyl styrene,
  586 g of acrylonitrile
  113 g of tert.-butyl acrylate.

Solution 2:
  30 g of the sodium salt of $C_{14}$ to $C_{18}$ alkyl sulphonic acid
  2600 g of water.

Polymerisation is continued for 6 hours at 75° C. 1% by weight (based on the solids content) of a phenolic stabilizer is added and the latex is adjusted to pH 9 with 0.5N sodium hydroxide solution. The latex is coagulated with an aqueous magnesium sulphate solution, and the polymer is washed with water and dried at 60° C.

B 3) The procedure is the same as in Example B 1), the following being used as solution 1:

Solution 1:
  1279 g of styrene
  497 g of acrylonitrile
  113 g of tert.-butyl acrylate.

B 4) The procedure is the same as in Example B 1), 1700 g of water and 1912 g of the polybutadiene latex being introduced into the reactor. The following are fed into the reactor as solutions 1 and 2:

Solution 1:
  1238 g of styrene,
  481 g of acrylonitrile
  66.35 g of tert.-butyl acrylate.

Solution 2:
  40 g of the sodium salt of disproportionated abietic acid
  34 g of 1N sodium hydroxide solution
  2200 g of water.

B 5) The procedure is the same as in Example B 1). 1701 g of water and 3438 g of the polybutadiene latex are introduced into the reactor. The following solutions are fed into the reactor as solutions 1 and 2 at 70° C. within 4 hours:

Solution 1:
  938 g of styrene,
  365 g of acrylonitrile
  47.25 g of tert.-butyl acrylate.

Solution 2:
  44 g of the sodium salt of disproportionated abietic acid
  36 g of 1N sodium hydroxide solution
  1400 g of water.

C) Graft rubbers

C 1) The procedure is the same as in Example B 1). The following solution is added as solution 1:

Solution 1:
  1361 g of styrene
  529 g of acrylonitrile.

C 2) Graft polymer of a cross-linked polybutadiene rubber base having an average particle diameter ($d_{50}$) of 360 nm and a graft shell of styrene-acrylonitrile in a ratio by weight of 72:28 and a rubber content of 55% by weight.

D) Thermoplastic resin polymer

Styrene-acrylonitrile resin containing 28 parts by weight of acrylonitrile and having a weight average molecular weight of 110,000 g/mol prepared by continuous mass polymerisation.

E) Thermoplastic resin copolymer with t-butyl acrylate

A terpolymer of styrene/acryolnitrile/tert.-butyl acrylate (67.7/26.3/6% by weight) having a weight average molecular weight of 90,000 g/mol prepared by radical emulsion polymerisation in water.

PREPARATION AND TESTING OF THE MOULDING COMPOUND

General method of procedure

Polyamide component A is melted on a continuously operating double shaft extruder and component B and optionally C, D and E are added to the melt and homogenised in the melt. The reaction temperature employed is 275° C. The molten strand is degasified before its exit from the die, introduced into water, granulated and dried.

Test rods measuring 80×10×4 mm and standard small rods are produced from the moulding compounds on a conventional injection moulding machine. The 80×10×4 mm test rods are used for testing the modulus in flexure (DIN 53 457) at RT and 80° C. and the impact strength and notched impact strength according to Izod (ISO 180) at RT and −20° C. The joint seam strength is determined on small standard rods by the impact bending test according to Charpy (ISO/R 179) at RT.

The water absorption is determined gravimetrically after 32 hours storage in a tropical climate (40° C., 95% relative humidity).

TABLE 1

| | Composition of the moulding compounds | | | | | | | | | |
|---|---|---|---|---|---|---|---|---|---|---|
| | | | | | Composition | | | | | |
| Example | A | B1 | B2 | B3 | B4 | B5 | C1 | C2 | D | E |
| 1* | 60 | — | — | — | — | — | 40 | — | — | — |
| 2* | 50 | — | — | — | — | — | 35 | 15 | — | — |
| 3* | 50 | — | — | — | — | — | — | 25 | 20 | 5 |
| 4 | 60 | 40 | — | — | — | — | — | — | — | — |
| 5 | 60 | — | 40 | — | — | — | — | — | — | — |
| 6 | 50 | 40 | — | — | — | — | — | 10 | — | — |
| 7 | 50 | 45 | — | — | — | — | — | 5 | — | — |
| 8 | 50 | — | — | 35 | — | — | — | 15 | — | — |
| 9 | 50 | — | — | — | 50 | — | — | — | — | — |
| 10 | 50 | — | — | — | — | 35 | — | — | 15 | — |

*Comparison experiments

TABLE 2

| | Properties of the moulding compounds | | | | | | | | |
|---|---|---|---|---|---|---|---|---|---|
| | Impact Strength (kJ/m$^2$) | | Notched Impact Strength (kJ/m$^2$) | | Modulus in flexure (MPa) | | JSS | Water Absorption | Total Rubber Content |
| Example | +20° C. | −20° C. | +20° C. | −20° C. | +20° C. | +80° C. | (kJ/m$^2$) | (%) | (%) |
| 1* | 63 | 64 | 9 | 8 | 2117 | 750 | 2 | 1.8 | 12.0 |
| 2* | 74 | 59 | 9 | 8 | 1993 | 660 | 2 | 2.1 | 18.75 |
| 3* | n.b. | 7 × n.b. | 23 | 19 | 2030 | — | 6 | 1.5 | 13.75 |

TABLE 2-continued

| | Properties of the moulding compounds | | | | | | | |
|---|---|---|---|---|---|---|---|---|
| | Impact Strength (kJ/m²) | | Notched Impact Strength (kJ/m²) | | Modulus in flexure (MPa) | | JSS | Water Absorption | Total Rubber Content |
| Example | −20° C. | −20° C. | −20° C. | −20° C. | −20° C. | −80° C. | (kJ/m²) | (%) | (%) |
| 4 | 9 > n.b. | 9 > n.b. | 71 | 27 | 2360 | 780 | 3 > n.b. | 1.9 | 12.0 |
| 5 | 4 > n.b. | 135 | 18 | 13 | 2145 | 710 | 8 | 1.9 | 12.0 |
| 6 | n.b. | n.b. | 71 | 34 | 1820 | 680 | 6 > n.b. | 1.7 | 17.5 |
| 7 | n.b. | n.b. | 70 | 34 | 1870 | 680 | 52 | 1.6 | 16.25 |
| 8 | n.b. | n.b. | 81 | 30 | 1846 | 570 | 55 | 1.7 | 18.25 |
| 9 | n.b. | n.b. | 43 | 33 | 1870 | 620 | 52 | 1.8 | 17.0 |
| 10 | n.b. | 6 > n.b. | 23 | 15 | 2010 | 690 | 11 | 1.8 | 19.25 |

JSS joint seam strength
\*: comparison experiments
—: not determined
n.b. not broken

We claim:

1. Thermoplastic moulding compounds containing
   A) from 35 to 97% by weight of a thermoplastic polyamide A,
   B) from 3 to 65% by weight of a graft polymer B containing graft shell B 1) of
      B 1.1) at least one monomer selected from styrene, α-methyl styrene, and acrylonitrile and
      B 1.2) at least one ester of (meth) acrylic acid and tertiary $C_4$ to $C_{10}$ alcohols in quantities of from 1 to 12% by weight in the graft shell B 1) grafted on a particulate rubber base B, said graft polymer B having a rubber content of from 5 to 60% by weight
   and
   C) from 0 to 45% by weight of a rubber polymer as impact strength modifier having a rubber content of 55% by weight the rubber content of component C being at least 10% by weight higher than the rubber content of component B.

2. Thermoplastic moulding compounds containing
   A) from 35 to 97% by weight of a thermoplastic polyamide A,
   B) from 3 to 65% by weight of a graft polymer B containing graft shell B 1) of
      B 1.1) at least one monomer selected from styrene, α-methyl styrene, and acrylonitrile and
      B 1.2) at least one ester of (meth) acrylic acid and tertiary $C_4$ to $C_{10}$ alcohols in quantities of from 3 to 10% by weight in the graft shell B 1) grafted on a particulate rubber base B, said graft polymer B having a rubber content of from 5 to 60% by weight
   and
   C) from 0 to 45% by weight of a rubber polymer as impact strength modifier having a rubber content of 55% by weight the rubber content of component C being at least 10% by weight higher than the rubber content of component B.

3. Thermoplastic moulding compounds according to claim 2 wherein B 1.1) comprises styrene or α-methyl styrene in combination with acrylonitrile.

4. Thermoplastic moulding compounds according to claim 2 wherein the graft polymer B has a rubber content from 10 to 50% by weight.

5. Thermoplastic moulding compounds according to claim 2 wherein the graft polymer B has a rubber content from 15 to 34% by weight.

6. Thermoplastic moulding compounds containing
   A) from 35 to 97% by weight of a thermoplastic polyamide A,
   B) from 3 to 65% by weight of a graft polymer B containing graft shell B 1) of
      B 1.1) styrene or α-methyl styrene in combination with acrylonitrile and
      B 1.2) at least one ester of (meth) acrylic acid and tertiary $C_4$ to $C_{10}$ alcohols in quantities of from 3 to 10% by weight in the graft shell B 1) grafted on a particulate rubber base B, said graft polymer B having a rubber content of from 10 to 50% by weight
   and
   C) from 0 to 45% by weight of a rubber polymer as impact strength modifier having a rubber content of 55% by weight the rubber content of component C being at least 10% by weight higher than the rubber content of component B.

7. Thermoplastic moulding compounds according to claim 6 wherein the graft polymer B has a rubber content from 15 to 34% by weight.

* * * * *